(12) United States Patent  (10) Patent No.: US 8,296,319 B2
Hirano  (45) Date of Patent: Oct. 23, 2012

(54) INFORMATION RETRIEVING APPARATUS, INFORMATION RETRIEVING METHOD, INFORMATION RETRIEVING PROGRAM, AND RECORDING MEDIUM ON WHICH INFORMATION RETRIEVING PROGRAM IS RECORDED

(75) Inventor: Hiromi Hirano, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/380,745

(22) PCT Filed: Jun. 28, 2010

(86) PCT No.: PCT/JP2010/060987
§ 371 (c)(1),
(2), (4) Date: Dec. 23, 2011

(87) PCT Pub. No.: WO2010/150910
PCT Pub. Date: Dec. 29, 2010

(65) Prior Publication Data
US 2012/0096028 A1   Apr. 19, 2012

(30) Foreign Application Priority Data

Jun. 26, 2009 (JP) .................................. 2009-152481

(51) Int. Cl.
*G06F 17/30* (2006.01)
(52) U.S. Cl. ........................................ 707/771
(58) Field of Classification Search .................. 707/706, 707/771
See application file for complete search history.

(56) References Cited

U.S. PATENT DOCUMENTS

2007/0118519 A1   5/2007   Yamasawa et al.
2007/0260450 A1*  11/2007  Sun .................................. 704/9

FOREIGN PATENT DOCUMENTS

| JP | 09-179875 A | 7/1997 |
| JP | 2004-127003 A | 4/2004 |
| JP | 2005-063158 A | 3/2005 |
| JP | 2005-346160 A | 12/2005 |
| JP | 2007-141090 A | 6/2007 |
| JP | 2008-210206 A | 9/2008 |

OTHER PUBLICATIONS

Atsushi Sakamoto, et al., "Taiwagata Shitsumon Oto System ni Okeru Aimai na Shitsumon ni Taisuru Toikaeshibun no Seisei", The Association for Natural Language Processing Dai 13 Kai Nenji Taikai Happyo Ronbunshu, Mar. 19, 2007, pp. 1006-1009.

* cited by examiner

*Primary Examiner* — Amresh Singh
(74) *Attorney, Agent, or Firm* — Sughrue Mion, PLLC

(57) ABSTRACT

The present invention provides an information retrieving apparatus and the like which replies a search result accurately to a question from the user.
In the present invention, sentence information of a sentence in collected documents is stored, information of a questioning sentence from the user is received from a terminal 2, the questioning sentence from the user is decomposed into segments (S10), documents having common arc segments are extracted from segments in the questioning sentence from the user, the documents are compared with the questioning sentence, and a leaf segment missing in the questioning sentence is retrieved (S12 to S16), and the search result is transmitted to the terminal 2 (S19).

8 Claims, 11 Drawing Sheets

FIG. 4

| No. | 0001 | |
|---|---|---|
| V | BUY(S) | r |
| S | HE | V |
| Ac | BOOK | V |
| D | | |
| L | (IN) SHOP A | V |
| ... | ... | |
| THE NUMBER OF ARCS | THREE | |
| CREATION TIME | 2008/07/06 | |
| ACCESS TIME | 2009/01/01 | |

FIG. 5

| No. | 0002 | |
|---|---|---|
| S | | |
| V | SOLD | N |
| Ac | | |
| D | | |
| L | (IN) SHOP A | V |
| ... | ... | |
| N | WINE | r |
| Adj | RED | N |
| ... | ... | |
| THE NUMBER OF ARCS | TWO | |
| CREATION TIME | 2008/07/06 | |
| ACCESS TIME | 2009/01/01 | |

FIG. 9
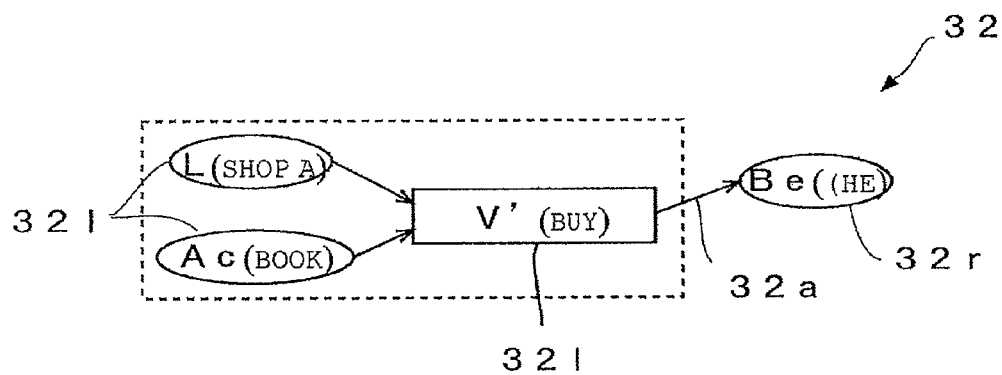
(A)
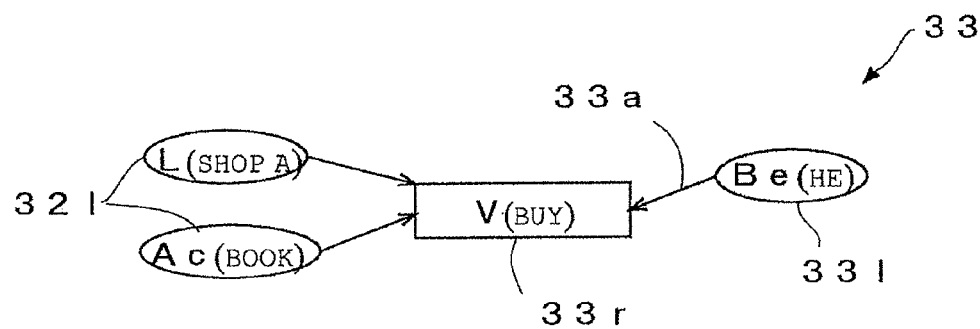
(B)
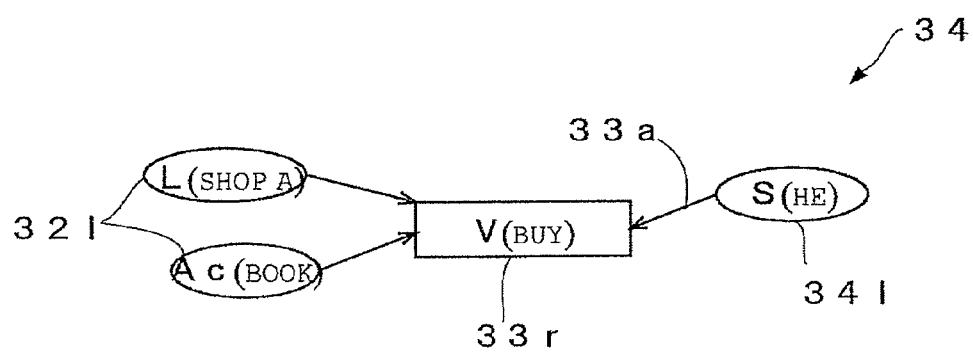
(C)

FIG. 10
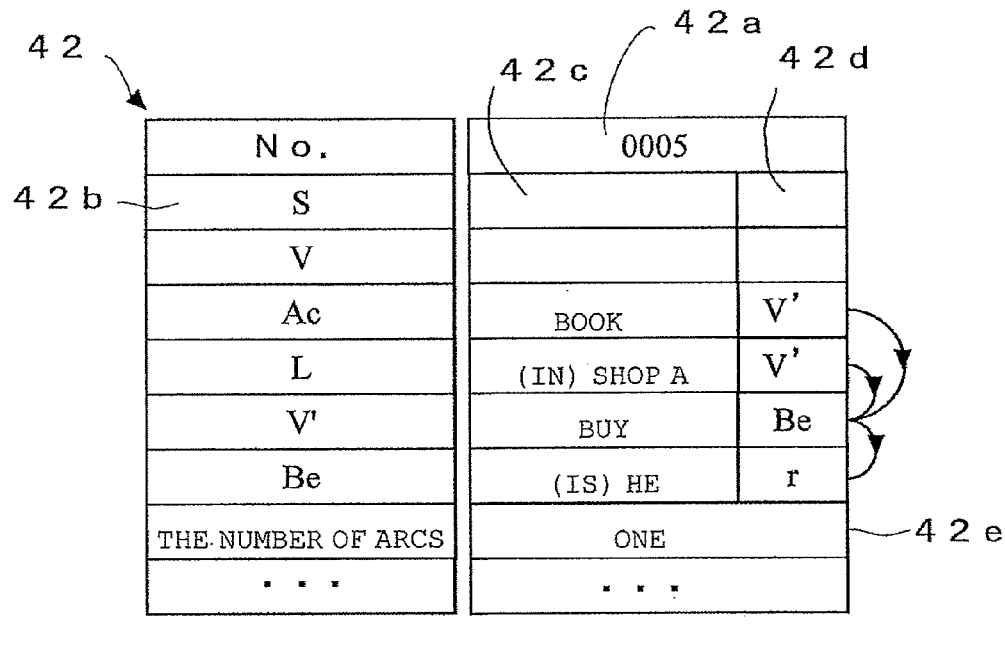
(A)
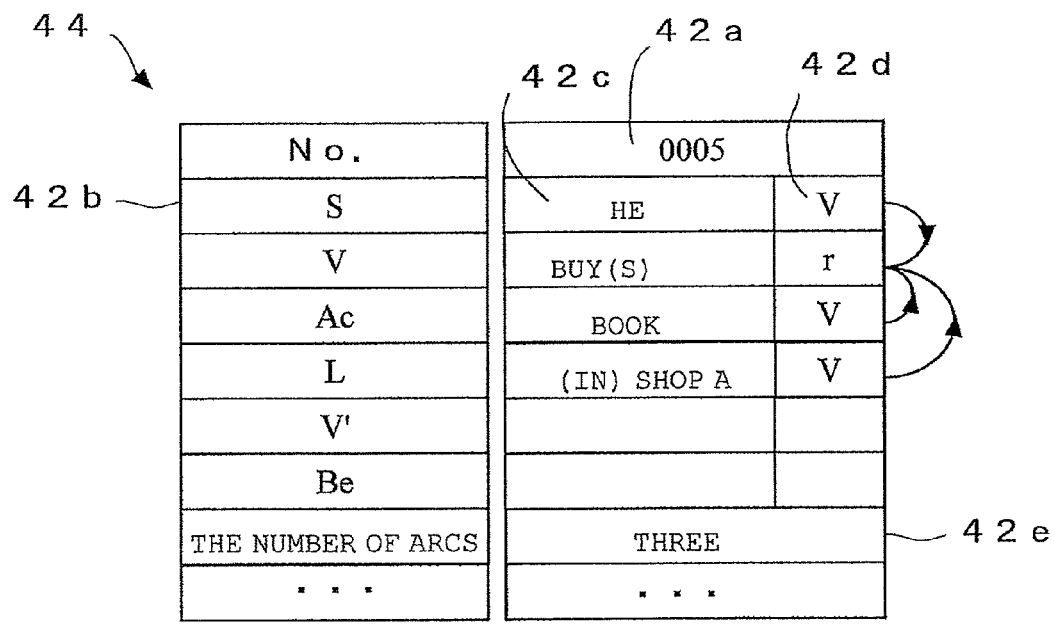
(B)

FIG. 13
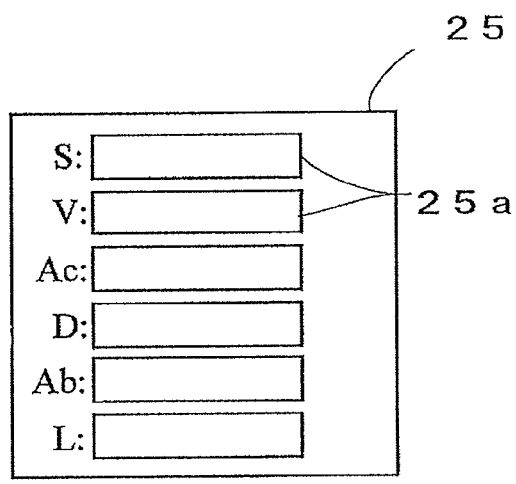
(A)
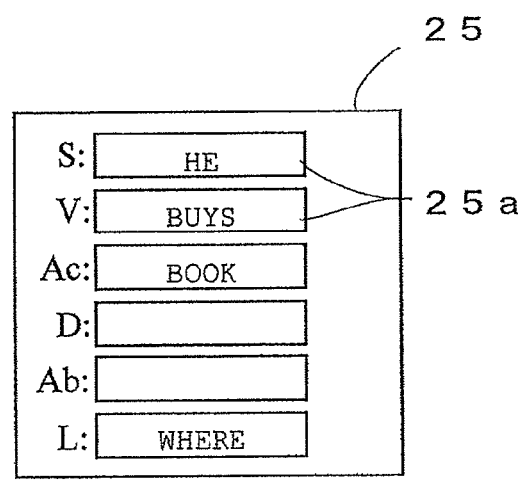
(B)

INFORMATION RETRIEVING APPARATUS, INFORMATION RETRIEVING METHOD, INFORMATION RETRIEVING PROGRAM, AND RECORDING MEDIUM ON WHICH INFORMATION RETRIEVING PROGRAM IS RECORDED

CROSS REFERENCE TO RELATED APPLICATIONS

This application is a National Stage of International Application No. PCT/JP2010/060987 filed Jun. 28, 2010, claiming priority based on Japanese Patent Application No. 2009-152481, filed Jun. 26, 2009, the contents of all of which are incorporated herein by reference in their entirety.

TECHNICAL FIELD

The present invention relates to a technical field of an information retrieving apparatus, an information retrieving method, an information retrieving program, and a recording medium on which an information retrieving program is recorded, for receiving information from a terminal, performing an information search, and transmitting a search result to the terminal.

BACKGROUND ART

With spread of the Internet, information on the Internet has increased explosively so that the user retrieves desired information from information existing on the Internet by using a search engine. In this case, the user conducts a search by entering a keyword related to desired information to the search engine. However, in the present circumstances, a search result varies largely depending on selection of a keyword, and the user cannot reach desired information immediately. The user bears a burden of selecting a keyword to efficiently reach desired information.

Consequently, a retrieving method enabling the user to perform a search only by entering a sentence without aware of a keyword is studied. For example, patent document 1 discloses a similar sentence retrieving program of performing a morphological analysis on an input sentence, determining a segment, analyzing dependency on the segment unit basis, arranging segments in appearance order, when a verb or a segment having no phase attachment appears, generating a compound word including the verb or segment and grouping all of segments before the verb or segment, recording the input sentence so as to be associated with the compound word into a sentence database, when an arbitrary original sentence is newly entered, generating a compound, and retrieving a sentence including a compound as a key from the sentence database using, as a key, the obtained compound word on the original sentence.

PRIOR ART DOCUMENT

[Patent Document]
[Patent Document 1] Japanese Unexamined Patent Application Publication No. 2008-210206

DISCLOSURE OF THE INVENTION

Problem to be Solved by the Invention

In the conventional technique, however, a sentence similar to an input sentence is replied. The user has to enter a sentence close to a reply by clearly consciously. In the case where the user does not clearly know an object of desired information and has a dubious point, for example, to a questioning sentence including an interrogative, an accurate answer cannot be obtained.

In the conventional technique, even if an answer is obtained, a search result is returned cyclopaedically, noise is largely included.

An object of the present invention is to provide an information retrieving apparatus, an information retrieving method, an information retrieving program, and a recording medium on which an information retrieving program is recorded, capable of accurately replying a search result to a question from the user.

Another object of the present invention is to provide an information retrieving apparatus, an information retrieving method, an information retrieving program, and a recording medium on which an information retrieving program is recorded, for preparing a suitable database of specifying a document structure on the basis of a morphological analysis and dependency parsing and, after that, converting the document structure to a structure adapted to a search and capable of accurately replying a search result to a question from the user.

Further another object of the present invention is to provide an information retrieving apparatus, an information retrieving method, an information retrieving program, and a recording medium on which an information retrieving program is recorded, capable of accurately replaying a search result to a question from the user on the basis of the number of arcs for a question and the number of arcs for an object to be retrieved.

Means for Solving the Problems

In order to achieve the object, the invention according to a claim 1 is characterized in that an information retrieving apparatus including: document collecting means for collecting documents; first document segment decomposing means for decomposing a sentence in the collected documents into segments; first document dependency parsing means for parsing a modification relation between segments in the sentence in the documents, and classifying each of the segments to at least a leaf segment and a root segment; document structure storing means for storing the documents, the segments in the documents, and kinds of the segments; receiving means for receiving, from a user terminal, information of a questioning sentence from the user to be input to the user terminal; second document segment decomposing means for decomposing the questioning sentence from the user into segments; second document dependency parsing means for parsing a modification relation between segments in the questioning sentence from the user and classifying each of the segments to at least a leaf segment and a root segment; document extracting means for extracting each of documents including a root segment corresponding to a root segment in the questioning sentence from the user by referring to the document structure storing means; retrieving means for retrieving a segment which is missing in segments of the questioning sentence from the user, in leaf segments in the documents with reference to the extracted documents; and transmitting means for transmitting the segment retrieved by the retrieving means to the terminal.

The invention according to a claim 2 is characterized in that the first document dependency parsing means gives an arc to a modification relation between segments in the collected documents, the first document dependency parting means compares the number of arcs in a root segment with the number of arcs of a leaf segment connected to the root segment via an arc, in the case where the number of arcs of the root segment is smaller than that of the leaf segment, converts the leaf segment to a root segment for a search, and converts the root segment to a leaf segment for a search, and the document structure storing means stores the segment and the arc subjected to the conversion.

The invention according to a claim 3 is characterized in that the document extracting means extracts each of documents including a root segment corresponding to a root segment in the questioning sentence from the user, and the root segment having the number of arcs exceeding the number of arcs of the root segment in the questioning sentence from the user, with reference to the document structure storing means.

The invention according to a claim 4 is characterized in that the information retrieving apparatus further including a questioning sentence generating means for generating a questioning sentence to the user on the basis of the retrieved segment, and the transmitting means transmits the questioning sentence to the user to the user terminal.

The invention according to a claim 5 is characterized in that the information retrieving apparatus further including a questioning sentence generating means for generating a questioning sentence to the user on the basis of the retrieved segment, and the transmitting means transmits the questioning sentence to the user to the user terminal in place of the retrieved segment.

The invention according to a claim 6 is characterized in that the questioning sentence generating means generates a questioning sentence to the user when the number of retrieved segments is equal to or larger than predetermined number.

The invention according to a claim 7 is characterized in that the information retrieving apparatus including: document collecting means for collecting documents; first document segment decomposing means for decomposing a sentence in the collected documents into segments; first document dependency parsing means for parsing a modification relation between segments in the sentence in the documents, and classifying each of the segments to at least a leaf segment and a root segment; document structure storing means for storing the document, the segments in the documents, and kinds of the segments; receiving means for receiving, from a user terminal, information of a questioning sentence from the user to be input to the user terminal; second document segment decomposing means for decomposing the questioning sentence from the user into segments; second document dependency parsing means for parsing a modification relation between segments in the questioning sentence from the user and classifying each of the segments to at least a leaf segment and a root segment; document extracting means for extracting each of documents including a root segment corresponding to a root segment in the questioning sentence from the user by referring to the document structure storing means; and transmitting means for transmitting each of documents extracted by the document extracting means to the terminal.

The invention according to a claim 8 is characterized in that an information retrieving method including: a document collecting step of collecting documents; a first document segment decomposing step of decomposing a sentence in the collected documents into segments; a first document dependency parsing step of parsing a modification relation between segments in the sentence in the documents and classifying the segments to at least a leaf segment and a root segment; a storing step of storing the documents, the segments in the documents, and kinds of the segments into document structure storing means; a receiving step of storing information of a questioning sentence from the user to be input to the user terminal from the terminal; a second document segment decomposing step of decomposing the questioning sentence from the user into segments; a second document dependency parsing step of parsing a modification relation between segments in the questioning sentence from the user and classifying the segments to at least a leaf segment and a root segment; a document extracting step of extracting each of documents including a root segment corresponding to a root segment in the questioning sentence from the user by referring to the document structure storing means; a retrieving step of retrieving a segment which is missing in segments of the questioning sentence from the user, in leaf segments in the documents with reference to the extracted documents; and a transmitting step of transmitting the segment retrieved by the retrieving means to the terminal.

The invention according to a claim 9 is characterized in that an information retrieving program which makes a computer function as: document collecting means for collecting documents; first document segment decomposing means for decomposing a sentence in the collected documents into segments; first document dependency parsing means for parsing a modification relation between segments in the sentence in the documents, and classifying each of the segments to at least a leaf segment and a root segment; document structure storing means for storing the documents, the segments in the documents, and kinds of the segments; receiving means for receiving, from a user terminal, information of a questioning sentence from the user to be input to the user terminal; second document segment decomposing means for decomposing the questioning sentence from the user into segments; second document dependency parsing means for parsing a modification relation between segments in the questioning sentence from the user and classifying each of the segments to at least a leaf segment and a root segment; document extracting means for extracting each of documents including a root segment corresponding to a root segment in the questioning sentence from the user by referring to the document structure storing means; retrieving means for retrieving a segment which is missing in segments of the questioning sentence from the user, in leaf segments in the documents with reference to the extracted documents; and transmitting means for transmitting the segment retrieved by the retrieving means to the terminal.

The invention according to a claim 10 is characterized in that a computer-readable recording medium which records a program for making a computer function as: document collecting means for collecting documents; first document segment decomposing means for decomposing a sentence in the collected documents into segments; first document dependency parsing means for parsing a modification relation between segments in the sentence in the documents, and classifying each of the segments to at least a leaf segment and a root segment; document structure storing means for storing the documents, the segments in the documents, and kinds of the segments; receiving means for receiving, from a user terminal, information of a questioning sentence from the user to be input to the user terminal; second document segment decomposing means for decomposing the questioning sentence from the user into segments; second document dependency parsing means for parsing a modification relation between segments in the questioning sentence from the user and classifying each of the segments to at least a leaf segment and a root segment; document extracting means for extracting each of documents including a root segment corresponding to a root segment in the questioning sentence from the user by referring to the document structure storing means; retrieving means for retrieving a segment which is missing in segments of the questioning sentence from the user, in leaf segments in the documents with reference to the extracted documents; and transmitting means for transmitting the segment retrieved by the retrieving means to the terminal.

According to the invention, an information retrieving apparatus has: document collecting means for collecting documents; first document segment decomposing means for decomposing a sentence in the collected documents into segments; first document dependency parsing means for parsing a modification relation between segments in the sentence in the documents, and classifying each of the segments to at least a leaf segment and a root segment; document structure storing means for storing the documents, the segments in the documents, and kinds of the segments; receiving means for receiving, from a user terminal, information of a questioning sentence from the user to be input to the user terminal; second document segment decomposing means for decomposing the questioning sentence from the user into segments; second document dependency parsing means for parsing a modification relation between segments in the questioning sentence from the user and classifying each of the segments to at least a leaf segment and a root segment; document extracting means for extracting each of documents including a root segment corresponding to a root segment in the questioning sentence from the user by referring to the document structure storing means; retrieving means for retrieving a segment which is missing in segments of the questioning sentence from the user, in leaf segments in the documents with reference to the extracted documents; and transmits the segment retrieved by the retrieving means to the terminal. Consequently, a search result can be replied as an answering sentence to a question part of a question from the user.

According to the present invention, a suitable database of specifying a document structure on the basis of a morphological analysis and dependency parsing and, after that, converting the document structure to a structure adapted to a search is prepared. Therefore, even a document in which a subjective case is a root segment such as a document ended with a noun is stored in a database by converting a leaf segment connected to the subjective case to a root segment for a search. Consequently, a search result can be replied more accurately to a question from the user.

Further, according to the present invention, a search result is accurately replied to a question from the user on the basis of the number of arcs for a question and the number of arcs for an object to be retrieved. Therefore, noise is eliminated from the search result, and the search result can be replied more accurately to a question from the user.

BRIEF DESCRIPTION OF DRAWINGS

FIG. 4 is a schematic diagram showing an example of a form realizing the data structure of FIG. 2.

FIG. 5 is a schematic diagram showing an example of a form realizing the data structure of FIG. 3.

FIGS. 9A to 9C are schematic diagrams showing an example of standardization of the data structure in the knowledge input management server in FIG. 1.

FIGS. 10A and 10B are schematic diagrams showing an example of a form realizing standardization of the data structure of FIG. 9.

FIGS. 13A and 13B are schematic diagrams showing an example of a question entry form in the inquiry answering server in FIG. 1.

BEST MODES FOR CARRYING OUT THE INVENTION

Best modes for carrying out the present invention will be described hereinbelow with reference to the drawings.

First, the schematic configuration and function of an information retrieving system according to an embodiment of the present invention will be described with reference to the drawings.

Figure 1:
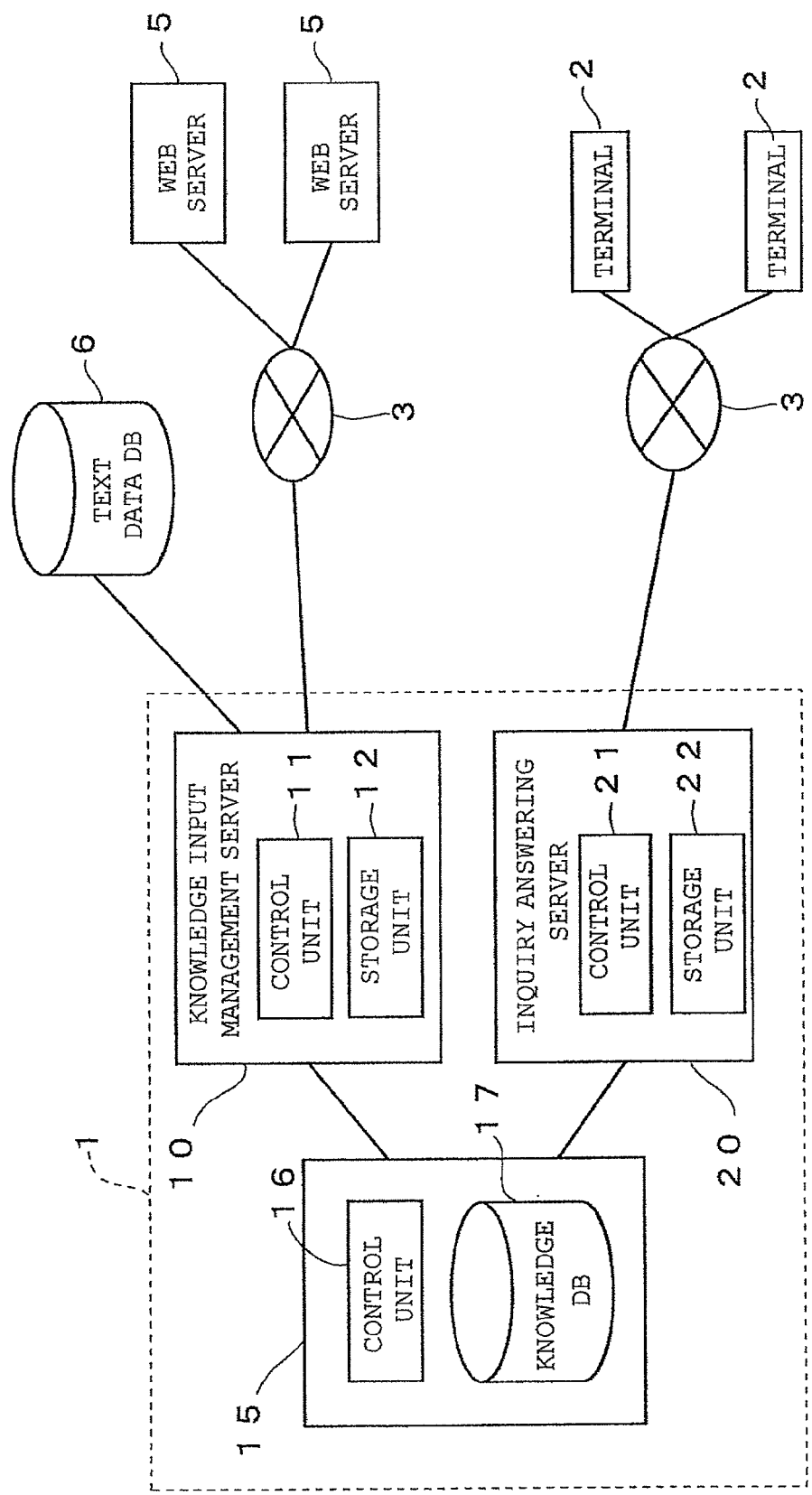
FIG. 1 is a block diagram showing an example of a schematic configuration of an information retrieving system according to an embodiment of the present invention.

FIG. 1 is a block diagram showing an example of a schematic configuration of an information retrieving system according to an embodiment of the present invention.

As shown in FIG. 1, an information retrieving system 1 has: a knowledge input management server 10 for receiving an entry of document on the Internet or the like and converting a sentence in the collected documents to a knowledge representation unit expressing the sentence as knowledge information for replying to a question from the user; a knowledge database server 15 for storing the knowledge representation unit as sentence information regarding the sentence of the collected documents; and an inquiry answering server 20 for receiving a question from the user and replying to the user on the basis of the knowledge representation unit stored in the knowledge database server 15. The collected documents itself may be or may not be stored in the system 1. The knowledge representation unit is structured data for retrieving a sentence from the documents to answer a question from the user and is, for example, tree-structured data based on a modification relation between segments of a sentence, and will be described in detail later.

As shown in FIG. 1, the knowledge input management server 10 in the information retrieving system 1 is connected to a web server 5 and a text data database 6 on a local area network via a network 3, and the inquiry answering server 20 in the information retrieving system 1 is connected to, for example, a terminal 2 such as a personal computer of the user via the network 3. The text data database 6 stores documents such as a blog or comment on the Internet as text data.

As shown in FIG. 1, the knowledge database server 15 is connected to the knowledge input management server 10 and the inquiry answering server 20 via the local area network or the like.

Next, as shown in FIG. 1, the knowledge input management server 10 has: a control unit 11 for analyzing a sentence of collected documents, and structurizing the sentence of the documents on the knowledge representation unit basis, and a storage unit 12 for storing an execution program of the control unit 11, a calculation result, and the like.

The control unit 11 has a CPU (Central Processing Unit) and the like and functions as document collecting means for collecting documents posted on the web server 5 and documents stored in the text data database 6, document segment decomposing means for decomposing a sentence in the collected documents into segments, document dependency parsing means for parsing a modification relation of the segments, and document structurizing means for structurizing the sentence of the documents to a structure such as the knowledge representation unit on the basis of the modification relation. The control unit 11 transmits the structured documents as the knowledge representation unit to the knowledge database server 15.

The storage unit 12 has a RAM (Random Access Memory), a ROM (Read Only Memory), a hard disk drive, and the like and stores programs executed as the document segment decomposing means, the document dependency parsing means, the document structurizing means, and the like. The hard disk drive, the nonvolatile RAM, and the ROM store, for example, a program for performing a morphological analysis and a program for performing a dependency parsing. A volatile RAM temporarily stores a morphological analysis and a program for performing a dependency parsing.

Next, as shown in FIG. 1, the knowledge database server 15 has a control unit 16 for conducting a search in accordance with a search request from the inquiry answering server 20, and a knowledge database 17 for storing a knowledge representation unit or the like transmitted from the knowledge input management server 10.

The control unit 16 has a CPU, a RAM, and the like and functions as database storing means for storing a structurized sentence as the knowledge representation unit in the knowledge database 17, search means which performs a search on the basis of the knowledge representation unit as an example of sentence information from the knowledge database 17, and the like.

The knowledge database 17 has a hard disk drive and the like and stores the knowledge representation unit on the sentence in the collected documents and user history such as information of an access to the knowledge representation unit of the user. Further, the knowledge database 17 also stores the user history such as profile of the user and purchase history. The user history other than information of an access to the knowledge representation unit may be stored in a database of another server. As described above, the knowledge database 17 functions as storing means for storing sentence information on a sentence in a collected documents, and the like.

The knowledge input management server 10 and the knowledge database server 15 function as a database creating apparatus, and the knowledge database server 15 and the inquiry answering server 20 function as an information retrieving apparatus.

As shown in FIG. 1, the inquiry answering server 20 has a control unit 21 for receiving information of a questioning sentence from the user from the terminal 2 and transmits an answer result to the user question to the user, and a storage unit 22 for storing the execution program of the control unit 21, a calculation result, and the like. An example of the questioning sentence from the user is a sentence including an interrogative such as "Where did he buy a book?"

The control unit 21 has a CPU and the like and functions as receiving means for receiving information of the questioning sentence from the user from a terminal, segment decomposing means for decomposing the questioning sentence from the user into segments, transmitting means for transmitting an answering sentence based on the sentence information retrieved as a search result to the terminal, and the like. The storage unit 22 has a RAM, a ROM, a hard disk drive, and the like and stores a program executed by the segment decomposing means or the like. A hard disk drive, a nonvolatile RAM, and a ROM store, for example, a program for performing the morphological analysis and a program for performing the dependency parsing. The volatile RAM temporarily stores a program which performs the morphological analysis and a program which performs the dependency parsing.

Next, the data structure (knowledge representation unit) of a sentence stored in the knowledge database 17 will be described with reference to FIGS. 2 and 3.

Figure 2:
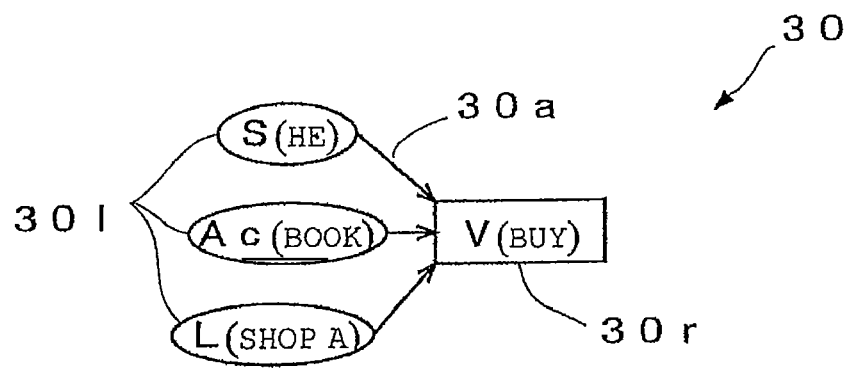
FIG. 2 is a schematic diagram showing an example of a data structure of a sentence stored in a knowledge database in FIG. 1.
Figure 3:
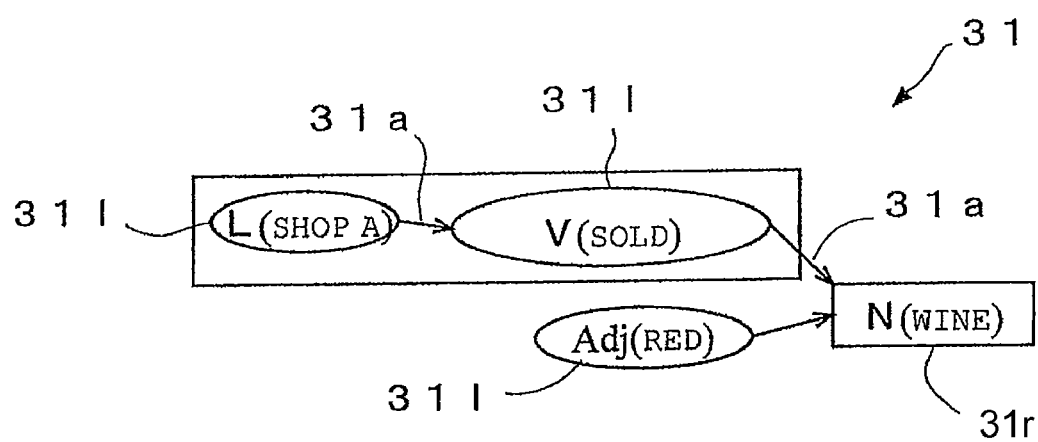
FIG. 3 is a schematic diagram showing an example of a sentence stored in the knowledge database in FIG. 1.

FIGS. 2 and 3 are schematic diagrams showing an example of the data structure of a sentence stored in the knowledge database 17.

As shown in FIG. 2, for example, a normal sentence is decomposed to segments by using the morphological analysis. According to the morphology, languages in the world are classified to agglutinative languages such as Japanese, isolating languages such as Chinese, and inflective languages such as European languages. In the case of the agglutinative languages, a segment is decomposed with a particle. In the case of the isolating language, each part of speech is decomposed as a segment. In the case of the infective languages, a segment is disposed to, for example, a part of speech accompanying a declension.

After that, in a knowledge representation unit 30, by using the dependency parsing, each segment is defined by segment kind as a root segment 30r corresponding to the root of a tree structure and a leaf segment 30l corresponding to a leaf in the tree structure or an inner node of the tree structure.

In the invention, the root segment as a segment kind is a segment which is found, as a result of the morphology analysis and the dependency parsing on collected documents, to have no dependency in the tree structure of the sentence. The leaf segment as another kind in the invention means a segment other than the root segment. Further, an arc is a concept expressing the modification relation between leaf segments and between a leaf segment and a root segment. An arc 30a is given with directivity from one segment to another segment.

In the case of a normal sentence such as "he buys a book in a shop A as a net shop", the root segment 30r is a verb V (buy), and the leaf segments 30l are subjective case S (he), an accusative case Ac (book), and a locative case L (shop A). In the case of a normal sentence, in the knowledge representation unit 30, arcs are given from the leaf segments 30l toward the root segment 30r, and the verb V is the root segment of the tree structure.

Next, in the case where a sentence ends with a noun or noun phrase (in the word order in Japanese), as shown in FIG. 3, in a knowledge representation unit 31, a noun N as an indeclinable word is the root segment 31r. In the case of a Japanese sentence ended with a noun or noun phrase "in the shop A sold red wine (it means that red wine sold in the shop A)", the root segment 31r is the noun N (wine), and leaf segments 311 are the locative case L (shop A), adjective Adj (red), and verb V (is sold) as an inner node. Arcs 31a are given with directivity from the leaf node 311 to the leaf node 311 and from the leaf node 311 to the root segment 31r.

The invention is not limited to such a Japanese sentence but a root segment is set according to a characteristic of a sentence in languages other than Japanese.

For example, in the case of a sentence mentioning a name, it is expressed as follows in various languages: (1) "私は XXX です" in Japanese; (2) "我姓XXX" in Chinese; and (3) "I am XXX" in English. The leaf segments are the subjective case (私, 我, and I) and the accusative case (XXX), and the root segments are the verbs V (です, 姓, and am). The modification relations are: (1) leaf segment (私)→leaf segment (XXX)→root segment (です) in Japanese; (2) leaf segment (我)→leaf segment (XXX)→root segment (姓) in Chinese; and (3) leaf segment I→leaf segment (XXX)→root segment (am) in English.

As described above, the knowledge representation unit is data obtained by converting one sentence to a sentence dependency structure and is data having a structure using a segment having no dependency as a root segment, that is, integrated by a verb, or a structure which uses a noun at the end of a sentence as the root sentence and is integrated by a noun, or a tree structure using a segment to which dependencies are concentratedly connected as a root segment. The knowledge representation unit is also an assembly of segments.

Next, the configuration of a knowledge representation unit in which the knowledge representation units 30 and 31 each having the tree structure are shown in a table format as a form of developing the knowledge representation units 30 and 31 on a storage medium of the knowledge database 17 will be described.

Figure 4:
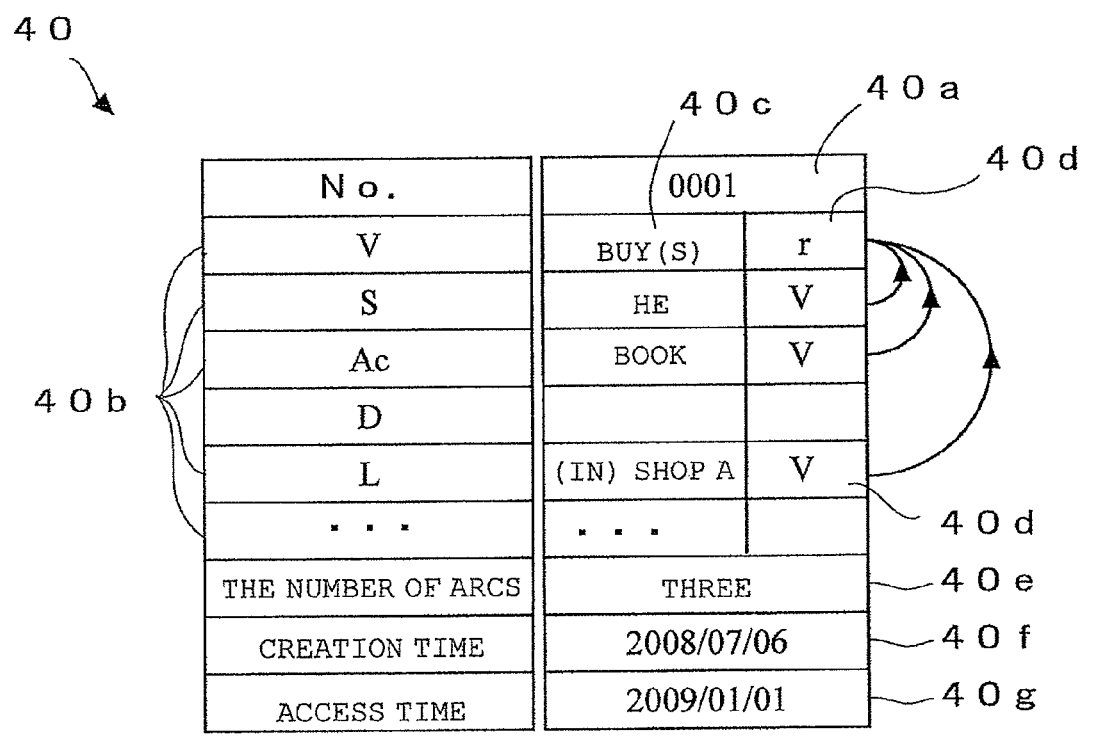
Figure 5:
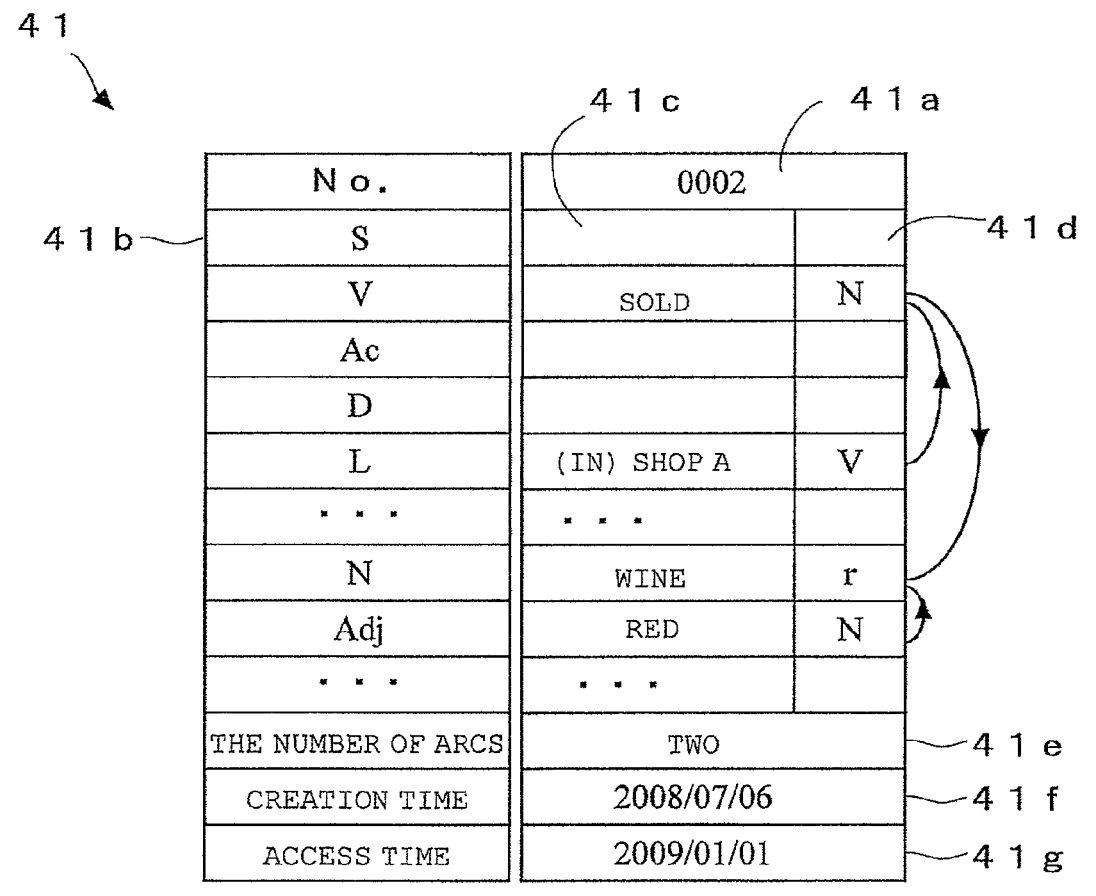

FIGS. 4 and 5 are schematic diagrams each showing an example of the form realizing the data structure.

As shown in FIG. 4, a knowledge representation unit 40 in the table form has a number field 40a assigned for specifying the knowledge representation unit 40, type items 40b each indicative of a part of speech and a case, or the like on the segment unit basis, phrase fields 40c indicative of phrases of segments obtained by decomposing a sentence, an arc field 40d indicative of a dependency or root, a field 40e of the number of arcs indicative of the number of arcs in the root of a tree structure, a creation time field 40f indicative of time of creation of the knowledge representation unit 40, and an access field 40g indicative of time of a final access to the knowledge representation unit 40. Examples of the information of the type of a segment include a case such as a subjective case or an objective case, a part of speech such as verb, noun, or adjective, and inflected forms of verbs and adjectives.

In correspondence with the knowledge representation unit 30 visually expressing the tree structure, in the knowledge representation unit 40 in the table format, "buy", "he", "book", "none", and "shop A" are entered in the phrase fields 40c corresponding to the type items 40b such as verb V, subjective case S, accusative case Ac, dative case D, and locative case L. Further, in the arc fields 40d, "r" indicative of the root, "V" indicative of a type of a segment modified in a dependency, and the like are stored. The number of arcs is stored in the field 40e of the number of arcs so that candidates are easily narrowed down in a search, and time is stored in the creation time field 40f and the access field 40g so that the knowledge representation unit 40 is easily controlled.

FIG. 5 shows a knowledge representation unit 41 in the table format employed in the case of a sentence ended with a noun or noun phrase like the knowledge representation unit 31. The configuration is similar to that of the knowledge representation unit 40 and phrases are stored also in the phrase fields 41c corresponding to the type items 41b of noun N and adjective Adj.

Figure 6:
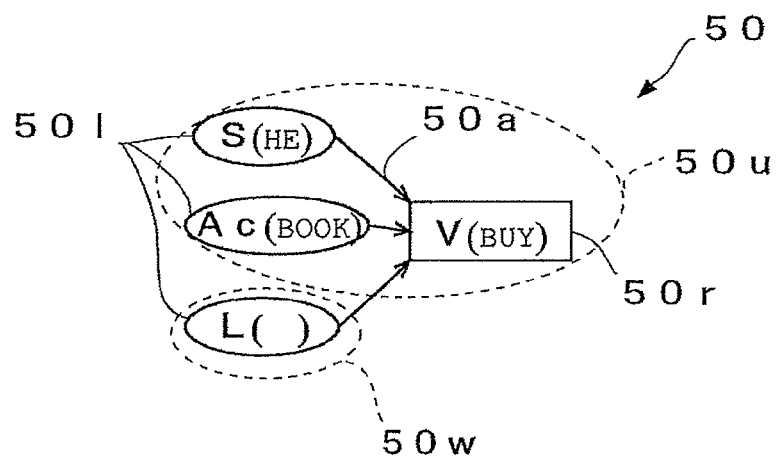
FIG. 6 is a schematic diagram showing an example of a data structure of a questioning sentence created by an inquiry answering server in FIG. 1.

Next, the data structure of a questioning sentence from the user generated in the inquiry answering server 20 will be described with reference to the drawing. FIG. 6 is a schematic diagram showing an example of a data structure of a questioning sentence created by the inquiry answering server.

The questioning sentence "where did he buy a book?" from the user is decomposed to segments, and a knowledge representation unit 50 expressing the modification relation of the segments in a tree structure has a root segment 50r corresponding to the root of the tree structure, leaf segments 50l corresponding to leaves in the tree structure, and arcs 50a corresponding to the arcs of the tree structure and expressing the modification relations. Further, the root segment 50r and the leaf segments 50l are classified into a questioning segment 50w corresponding to a question part such as an interrogative and a non-questioning segment 50u which is not related to a question. In the non-questioning segment 50u, the root segment 50r to which other segments depend and a part of the leaf segments become non-dependency segments. Examples of information of segments such as information of a questioning segment and information of a non-questioning segment include not only information of the type of a segment but also information of dependency such as dependency from other segments and dependency to other segments, information of the number of dependencies such as the number of arcs, information of a character string, information of the root and leaves in the tree structure of the segments, and information of a characteristic of the structure between segments.

In the case of the questioning sentence from the user "where does he buy a book?", the root segment 50r is a verb V (buy), and the leaf segments 50l are a subjective case S (he), accusative case Ac (book), and locative case L ( ) The questioning segment 50w as an example of a segment missing in the segments of the questioning sentence from the user is the locative case L ( ) and may be expressed as a null segment like the locative case L ( ) an interrogative such as the locative case L (where), an unknown variable like the locative case L (X), or the like. The non-questioning segment 50u is the subjective case S (he) and the accusative case Ac (book). In such a manner, the questioning sentence from the user has a tree structure similar to the data structure of the knowledge database 17.

Figure 7:
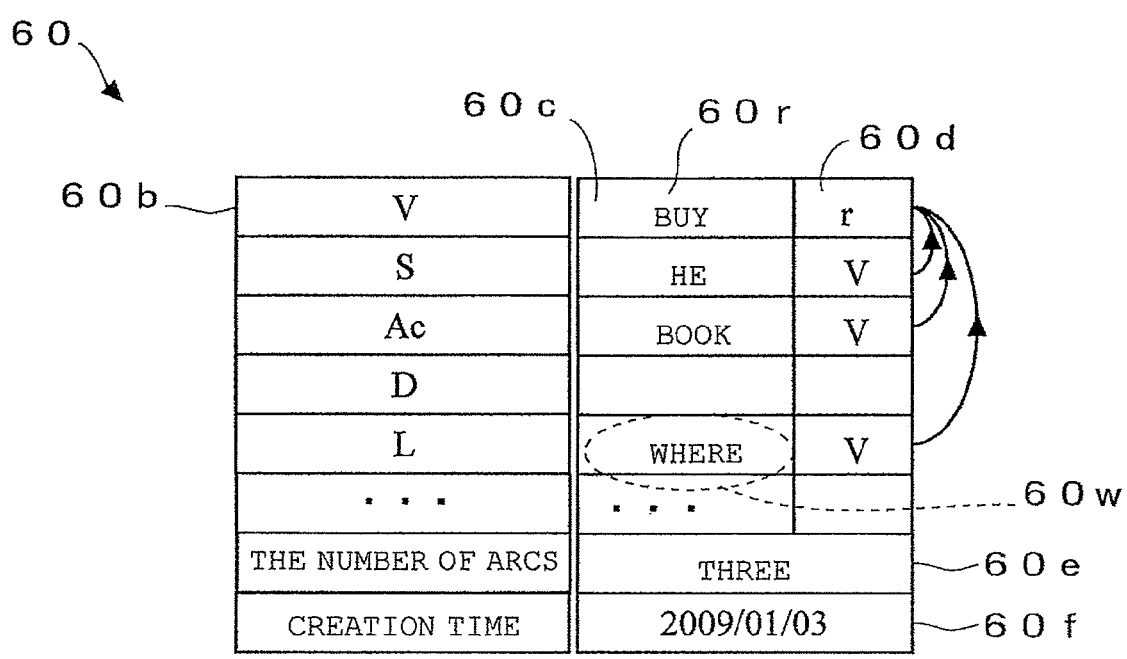
FIG. 7 is a schematic diagram showing an example of a form realizing the data structure of FIG. 6.

Next, the configuration of a knowledge representation unit expressing, in the table format, the knowledge representation unit 50 of the tree structure of the questioning sentence from the user will be described. FIG. 7 is a schematic diagram showing an example of a form realizing the data structure.

As shown in FIG. 7, a knowledge representation unit 60 in a table format has type items 60b indicative of a part of speech and a case, or the like, phrase fields 60c showing segments obtained by decomposing a sentence, arc fields 60d indicative of dependencies and the root, a field 60e of the number of arcs indicative of the number of arcs in the root of the tree structure, and a creation time field 60f indicative of time of creation of the knowledge representation unit 60.

In the phrase field 60c of the verb V whose arc field 60d is "r", "buy" is entered as a phrase of the root segment 60r. In the phrase field 60c of the locative case L, an interrogative such as the phrase "where" of the questioning segment 60w is entered. The phrase in the phrase field 60c in which the questioning segment 60w is entered may be a sign which can be specified as a questioning segment in segments obtained by decomposing the questioning sentence from the user and may be expressed as an unknown variable such as "X".

Next, as operations of the information retrieving system 1, an operation of converting a sentence of collected documents to knowledge representation units and an operation of making a search in accordance with an inquiry from the user and replying to the question will be described with reference to the drawings.

Figure 8:
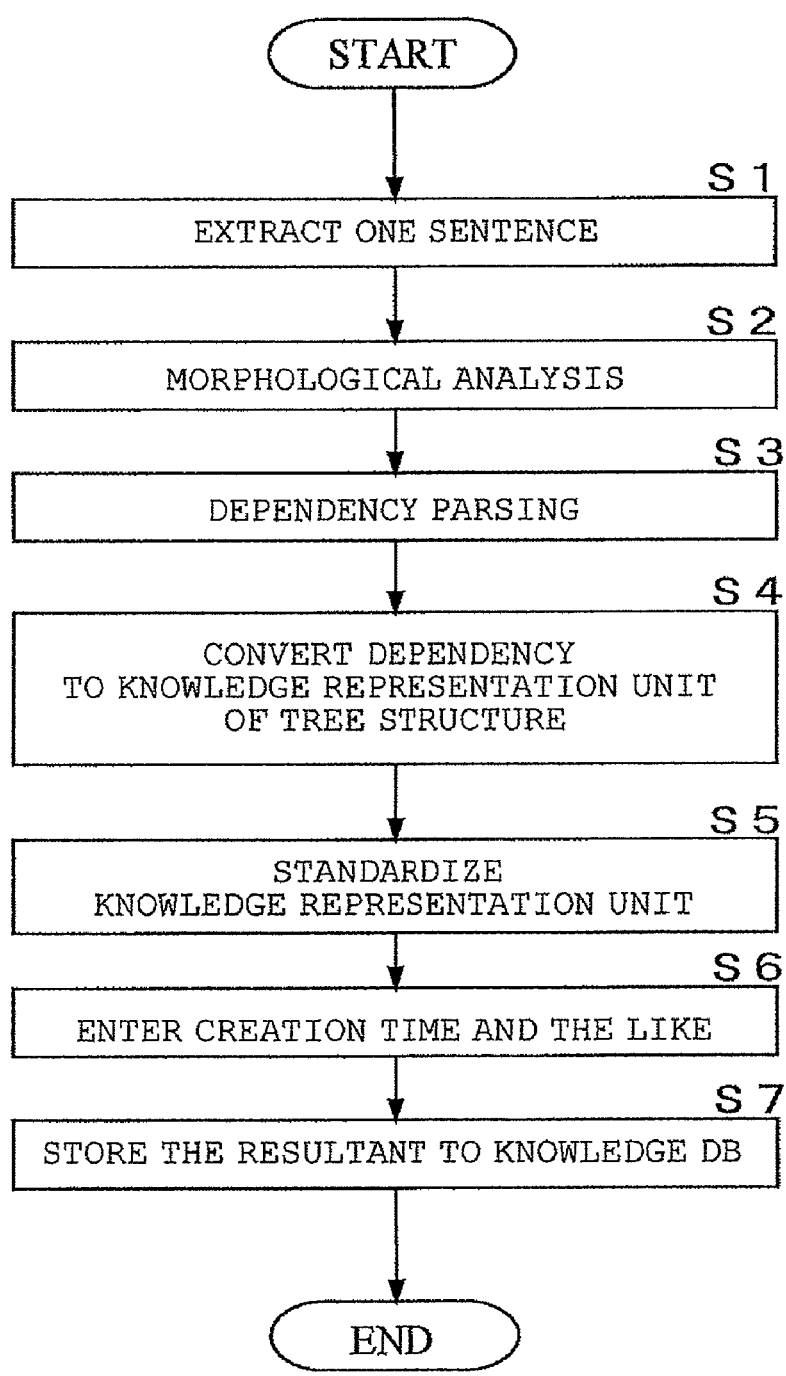
FIG. 8 is a flowchart showing an operation example of converting a sentence of documents to a data structure in a knowledge input management server of FIG. 1.

First, the operation of converting a sentence of collected documents to knowledge representation units will be described. FIG. 8 is a flowchart showing an operation example of converting a sentence of documents collected from the web server 5 or the like to a data structure in the knowledge input management server 10.

As shown in FIG. 1, the control unit 11 of the knowledge input management server 10 collects documents for generating the knowledge database 17 from the web server 5, the text data database 6, and the like. In this manner, the control unit 11 functions as document collecting means for collecting documents.

Next, as shown in FIG. 8, the control unit 11 of the knowledge input management server 10 extracts one sentence to be converted to the knowledge representation unit from the collected documents (step S1). Concretely, the control unit 11 extracts sentences one by one in order from the head sentence of the documents.

The control unit 11 performs the morphological analysis on the extracted sentence (step S2). Concretely, using a program of the morphological analysis, the control unit 11 decomposes the extracted sentence to segments and obtains the type such as a part of speech and case, or the like of each segment. For the morphological analysis, it is sufficient to use a general morphological analysis program. In this manner, the control unit 11 functions as first document segment decomposing means for decomposing a sentence in collected documents into segments.

After decomposition to segments, the control unit 11 conducts the dependency parsing (step S3). Concretely, the control unit 11 obtains a dependency indicative of the modification relation between the segments by using the dependency parsing program. For the dependency parsing, it is sufficient to use a general dependency parsing program. In this manner, the control unit 11 functions as document dependency parsing means for parsing a dependency relation between segments of a sentence in documents.

In each of the languages, using the characteristics of each language structure or dictionaries of each language, a sentence is decomposed to segments, and the segments are classified to types of parts of speech or the like, and a dependency relation is parsed. For example, in the case of the agglutinative language such as Japanese, a suffix and a prefix are used. In the case of the isolating language, information of the word order or the like is used.

After completion of the dependency parsing, the control unit 11 converts the modification relation of the sentence to knowledge representation units having a tree structure (step S4). Concretely, in the case of a normal sentence, as shown in FIG. 2, the control unit 11 converts the dependency parsing of a sentence to a tree structure using the segment of the verb as the root on the basis of the information of the dependency. In the case of a sentence ended with a noun, as shown in FIG. 3, the control unit 11 converts the dependency parsing of a sentence to a tree structure using the noun with which the sentence is ended as the root. In the case of Japanese, a segment before a period mark or a segment at the end of a sentence is used as the root segment. In the case of Chinese, English, and the like, the root segment is specified on the basis of, further, disposition of a word, information of apart of speech, and the like. In this manner, the control unit 11 functions as document structurizing means for structurizing a sentence in documents on the basis of the modification relation.

In the case of a knowledge representation unit in the table format as shown in FIGS. 4 and 5, the control unit 11 enters a segment of a sentence decomposed to segments and whose type such as a part of speech and a case, or the like is specified in step S2 into phrase fields 40c and 41c. In the case of Japanese, a particle and an auxiliary verb in parentheses in the diagram may be eliminated. On the basis of the dependency parsing in step S3, the control unit 11 enters information of the root segment and information of a segment to which a dependency is connected into the arc fields 40d and 41d. Further, the control unit 11 counts the number of segments depending on the root segment, enters the number of arcs in the field 40e of the number of arcs, and enters information of date and time when the knowledge representation units 40 and 41 are created. As described above, the control unit 11 functions as first document dependency parsing means for analyzing a modification relation between segments of a sentence in documents, and classifying each of the segments to, at least, leaf segments and a root segment.

Next, the control unit 11 standardizes the knowledge representation unit (step S5). The standardization is performed to absorb the difference in a surface representation of a sentence. For example, a sentence "a person who buys a book in the shop A is he" and a sentence "he buys a book in the shop A" are substantially the same. However, as shown in FIG. 9A, a knowledge representation unit 32 of "a person who buys a book in the shop A is he" has a tree structure in which a leaf segment 321 is connected to a root segment 32r, and two leaf segments 321 are connected to the leaf segment 321 connected to the root segment 32r, and is largely different from the knowledge representation unit 30 shown in FIG. 2. As a concrete process, as shown in FIG. 9B, the control unit 11 makes the direction of an arc 32a between the root segment 32r and the leaf segment 321 in the knowledge representation unit 32 opposite and uses the arc as an arc 33a to set the leaf segment 321 as a root segment 33r for a search. The control unit 11 sets the root segment 32r as a leaf segment 331 for a search. Further, the control unit 11 operates the types of the segments to change "V' (a person who buys)" of the leaf segment 321 to "V (buys)" of the root segment 33r. As shown in FIG. 9C, the control unit 11 operates to change the type (Be) of the leaf segment 331 for a search to type (S). In this manner, the control unit 11 standardizes the knowledge representation unit by setting the directions of arcs to the node on which many arcs depend and operating the type of the segment.

In the present invention, the leaf segment for a search is a segment using the root segment as the origin and means a segment subjected to the process of operating the type of the segment and, after that, stored as a leaf segment. In the present invention, the root segment for a search is a segment using a leaf segment as the origin and means a segment subjected to the process of operating the type of the segment and, after that, stored as the root segment.

FIGS. 10A and 10B illustrate the series of processes in the knowledge representation unit in the table format. As shown in FIG. 10A, a knowledge representation unit 42 is obtained by converting the knowledge representation unit 32 into a table format. In the case where the number of arcs related to segments depending on leaf segments connected to the root segment is larger than that depending on the root segment, the control unit 11 converts the leaf segment to the root segment for a search. For example, as shown in FIGS. 10A and 10B, the control unit 11 performs type operation to move V':"(a person who) buys" to V: "buys" in the phrase field 42c, and sets the type V to "r" and changes "V'" in the types Ac and L to "V" in the arc fields 42d. The control unit 11 performs type operation to move Be: "(is) he" to S: "he" in the phrase field 42c and sets type S: "V'" in the arc field 42d. By the series of processes, the knowledge representation unit 42 is converted to the knowledge representation unit 44 showing the knowledge representation unit 34 in the table format.

As described above, the control unit 11 functions as modification relation reversing means for reversing the direction of the modification relation in a sentence in structured documents and segment type operating means for operating the type of a segment whose modification relation is reversed. The control unit 11 also functions as first document dependency parsing means for comparing the number of arcs for the root segment and the number of arcs for a leaf segment connected from the root segment via the arcs, in the case where the number of arcs for the root segment is smaller than that of the leaf segment, converts the leaf segment to the root segment for search, and converts the root segment to a leaf segment for a search.

After standardizing a knowledge representation unit to be standardized, the control unit 11 enters the creation time and the like in the knowledge representation unit (step S6). Concretely, as shown in FIG. 4 and the like, the control unit 11 enters creation date and time of the knowledge representation unit in the creation time field 40f. When a sentence is decomposed to knowledge representation units, the control unit 11 sends the knowledge representation units to the knowledge database server 15. For example, the control unit 11 transmits information of segments and arcs of a document and information of segments and arcs of the document standardized and converted to the knowledge database server 15.

When a knowledge representation unit is received, the control unit 16 in the knowledge database server 15 stores the knowledge representation unit into the knowledge database 17 (step S7). Overlapping knowledge representation units may not be stored. As a matching method to determine whether knowledge representation units overlap or not, a method similar to a search which will be described later may be employed.

As described above, the control unit 16 functions as database storing means for storing a knowledge representation unit as an example of a sentence in a structurized document, and storing means for storing, as sentence information, a knowledge representation unit as an example of document information based on the modification relations between segments in a sentence of documents. The control unit 16 also functions as document structure storing means for storing documents, segments in the documents and kinds of the segments, and document structure storing means for storing the segments and arcs converted.

Next, an operation of conducting a search in accordance with an inquiry from a user and replying to a question will be described. This is an example of an operation of retrieving a segment which is missing in segments of a questioning sentence from the user in leaf segments in the documents.

Figure 11:
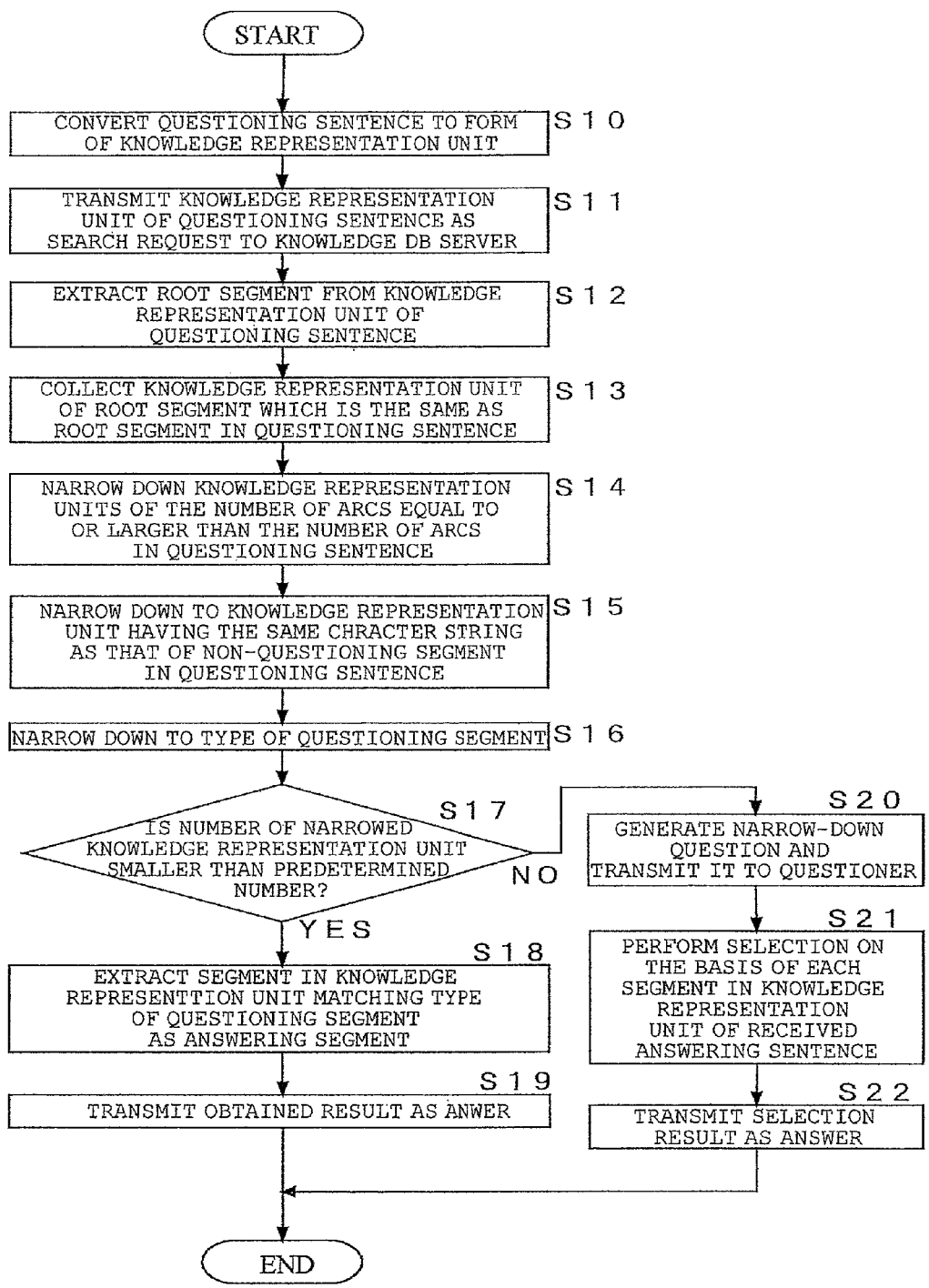
FIG. 11 is a flowchart showing an operation example of sending a reply to an inquiry from a user in the information retrieving system of FIG. 1.
Figure 12:
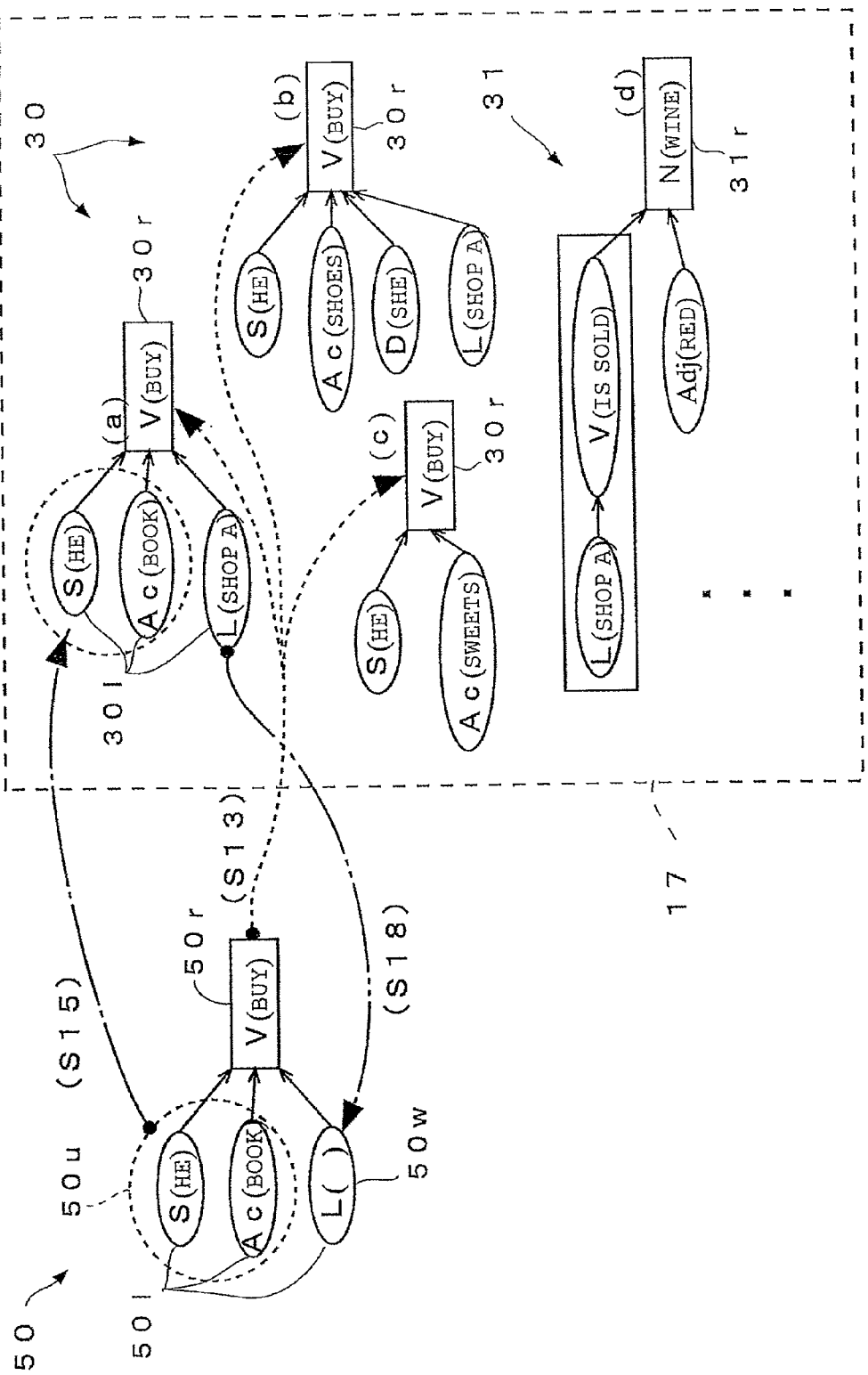
FIG. 12 is a schematic diagram showing an example of a data structure stored in the knowledge database in FIG. 1.

FIG. 11 is a flowchart showing an operation example of conducting an information search in accordance with an inquiry from a user and sending a reply in the information retrieving system 1. FIG. 12 is a schematic diagram showing an example of knowledge representation units stored in data structure stored in the knowledge database 17.

First, the control unit 21 receives a questioning sentence from the user from the terminal 2 of the user, such as a questioning sentence "Where did he buy a book?" The control unit 21 functions as receiving means for receiving information of a questioning sentence from the user from the terminal.

Next, the control unit 21 of the inquiry answering server 20 for receiving the questioning sentence from the user converts the questioning sentence from the user to a form in the knowledge representation units (step S10). Concretely, the control unit 21 performs the morphological analysis on the questioning sentence from the user, decomposes the questioning sentence to segments, and specifies the types such as a part of speech and a case, or the like of each of the segments. The control unit 21 performs dependency parsing on the segments and converts the questioning sentence from the user to knowledge representation units. For example, the control unit 21 converts the questioning sentence from the user to the knowledge representation unit 50 as shown in FIG. 6 and the knowledge representation unit 60 in the table form as shown in FIG. 7. In this manner, the control unit 21 functions as second segment decomposing means for decomposing the questioning sentence from the user into segments and dependency parsing means for analyzing the modification relation between the segments of the questioning sentence from the user. The control unit 21 functions as second document dependency parsing means for analyzing the modification relation between the segments of the questioning sentence from the user and classifying each of the segments at least to a leaf segment and a root segment.

Next, the control unit 21 transmits the knowledge expression units 50 and 60 in the questioning sentence from the user as a search request to the knowledge database server 15 (step S11).

The control unit 16 in the knowledge database server 15 for receiving the knowledge representation units 50 and 60 of the questioning sentence from the user extracts root segments 50r and 60r from the knowledge representation units 50 and 60 of the questioning sentence from the user (step S12). This step is to use a segment on which dependencies are concentrated for a search so that the search can be conducted efficiently. However, the knowledge representation units are standardized so that dependencies are concentrated on the root segment as much as possible. Consequently, it is sufficient for the control unit 16 to extract the root segments 50r and 60r. In the case of the knowledge representation unit 60 in the table format shown in FIG. 7, the control unit 16 collates the type "r" in the arc field 60d and a character string in a phrase field 60c with the type "r" in the arc fields 50d and 51d of the knowledge representation units 50 and 51 and the like in the knowledge database 17 and the character string in the phrase fields 50c and 51c. In such a manner, the control unit 21 functions as segment classifying means for classifying each of the segments 50r and 50l in the questioning sentence from the user to the questioning segments 50w related to the question and the non-questioning segments which are not limited to the question. In the collation of the character strings, phrases whose meaning is close to each other may be determined to correspond to each other by using a dictionary of synonyms.

Next, the control unit 16 collects the knowledge representation unit of the root segment corresponding to the root segment in the questioning sentence from the user (step S13). Although "the same root segments" are collected in step 13 in FIG. 11, root segments for a search may be extracted or root segments having similar meaning may be extracted by using a dictionary of synonyms or the like. Concretely, as shown in FIG. 12, the control unit 16 collects the knowledge representation units 30(a), (b), and (c) having the root segment 30r whose type and whose character string are the same as those of the root segment 50r in the questioning sentence from the user. In such a manner, the control unit 16 functions as retrieving means for retrieving the knowledge representation units 30 and 31 as an example of sentence information from the knowledge database 17 on the basis of information of the root segment 50r as an example of a depended segment on which other segments depend. The control unit 16 also functions as search means for conducting a search by collation between 50r as an example of a depended segment in the questioning sentence from the user and 30r as an example of a depended segment in the sentence information.

As described above, the control unit 16 functions as means for extracting each of documents including a root segment corresponding to the root segment in the questioning sentence from the user with reference to document structure storing means.

Next, the control unit 16 narrows down to the knowledge representation units each having the number of arcs equal to or larger than the number of arcs in the questioning sentence from the user (step S14). Concretely, as shown in FIG. 12, the control unit 16 narrows down the knowledge representation units 30(*a*), (*b*), and (*c*) to the knowledge representation units 30(*a*) and (*b*) each having the number of arcs which is equal to or larger than the number of arcs "3" in the questioning sentence from the user. In the case of the knowledge representation units in the table form, the control unit 16 compares the value in the field 60*e* of the number of arcs of the knowledge representation unit 60 in the questioning sentence from the user with the values in the fields 50*e* and 51*e* of the number of arcs in the knowledge representation units 50 and 51. In the case where a verb is the root segment, the number of cases such as the subjective case S, the accusative case Ac, and the locative case L is the number of arcs. In such a manner, the control unit 16 functions as search means for performing a search on the basis of the number of cases in the questioning sentence from the user as an example of the number of segments depending on the depended segment in the questioning sentence from the user.

As described above, the control unit 16 functions as document extracting means for extracting each of documents including a root segment corresponding to a root segment in a questioning sentence from the user and having the number of arcs exceeding the number of arcs of the root segment in the questioning sentence from the user with reference to the document structure storing means.

Next, the control unit 16 narrows down to the knowledge representation unit having the same character string as that of the non-questioning segment (except for the root segment) in the questioning sentence from the user (step S15). Concretely, as shown in FIG. 12, the control unit 16 narrows down to the knowledge representation unit 30 (*a*) having the same character strings that of the non-questioning segment 50*y* in the leaf segment 401. In the case of the knowledge representation unit in the table form, the control unit 16 narrows down to the knowledge representation units having the same character strings that in "S" and "Ac" in the type item 60*b*. In collation and comparison of character strings, phrases having similar meanings may be determined as the same character strings by using a dictionary of synonyms or the like.

Next, the control unit 16 narrows down to the type of the questioning sentence (step S16). Concretely, the control unit 16 narrows down, as candidates, the knowledge representation units narrowed in step S15 by determining whether the segment of the locative case L as the type of the questioning sentence exists or not. In the case of the knowledge representation unit in the table form, the control unit 16 determines whether there is a phrase in the narrowed knowledge representation units, in the field of the locative case L as the type of the questioning sentence 60*w*. In such a manner, the control unit 16 functions as retrieving means for retrieving document information of a reply to the questioning sentence from the user from the storing means on the basis of information of the type of the questioning segment and information of the non-questioning segment.

Next, the control unit 16 determines whether the number of knowledge representation units narrowed down is smaller than predetermined number or not (step S17). Concretely, the predetermined number is set so that candidates of replies can be narrowed down to about 7±2 as a magic number of storage which is acceptable by the user.

In the case where the number of knowledge representation units is smaller than the predetermined number (YES in step S17), the control unit 16 extracts, as a answering segment, a segment in a knowledge representation unit whose type matches the type of the questioning sentence (step S18). Concretely, the control unit 16 extracts a character string from the answering segment in the knowledge representation unit which matches the type of the questioning segment, replaces it with the interrogative in the questioning segment in the questioning sentence from the user or replaces the questioning segment to the answering segment, thereby converting the questioning sentence from the user to the answering sentence. By extracting a segment in the knowledge representation unit which matches the type of the questioning segment as an answering segment, a segment missing in the segments in the questioning sentence from the user is retrieved. In such a manner, the control unit 16 functions as answering segment obtaining means for obtaining an answering segment by extracting a segment having the type matching the type of the questioning segment from the retrieved sentence information.

The control unit 16 writes access time in the knowledge representation unit finally narrowed down. For example, the control unit 16 writes information of date and time in the access field 40*g* in the knowledge representation unit 40. The control unit 16 transmits, as search results, the answering segment, the narrowed knowledge representation unit, and the answering sentence converted from the questioning sentence from the user to the inquiry answering server 20.

Next, the control unit 21 transmits the obtained search results as an answer to the terminal 2 (step S19). Concretely, the control unit 21 transmits the answering sentence converted from the questioning sentence from the user as an example of a sentence based on the retrieved sentence information and a sentence of documents corresponding to the narrowed-down knowledge representation unit to the terminal 2. In the case of a sentence in documents corresponding to the narrowed-down knowledge representation unit, not the answering sentence converted from the questioning sentence from the user, the narrowing operation is performed in the case where the number of arcs is large in step S14 so that a segment of a case which does not exist in the questioning sentence from the user may be included. As described above, the control unit 21 functions as transmitting means for transmitting an answering sentence based on the retrieved sentence information to a terminal and transmitting means for transmitting information on the answering segment. The control unit 21 functions as transmitting means for transmitting a segment retrieved by the retrieving means to the terminal 2. The control unit 21 functions as transmitting means for transmitting documents extracted by the extracting means to the terminal.

On the other hand, in the case where the number of knowledge representation units is equal to or larger than the predetermined number (NO in step S17), the control unit 16 creates a narrow-down question and the control unit 21 receives the narrow-down question from the knowledge database server 15 and transmits it to a questioner (step S20). For example, in the case where the questioning sentence from the user is "What did he buy?", there is the possibility that the number of segments in non-questioning segments is smaller and a number of corresponding knowledge representation units exist in the knowledge database 17. In this case, the control unit 16 can obtain information of segments of types (types which do not exist in the questioning sentence from the user) other than the subjective case S and the accusative case Ac. For example, in the case where there are many segments of the locative case L, the questioning segment "where" is generated on the basis of the locative case L, and a narrow-down question "Where did you buy" is generated as a question for narrowing by the control unit 16. The verb "buy" in the questioning sentence from the user is used. In such a manner, the control unit 16 functions as a questioning sentence generating means for generating a questioning sentence to the user, which generates a questioning sentence to the user on the basis of the retrieved sentence information, and the control unit 21 functions as transmitting means for transmitting the questioning sentence to the user.

In the case where the number of knowledge representation units is equal to or larger than a predetermined number, the control unit 16 transmits the questioning sentence to the user in place of the retrieved segment to the terminal.

The number of knowledge representation units retrieved (the number of segment assemblies retrieved) is equal to or larger than a predetermined number, the number of knowledge representation units becomes large, and the number of segments included in the knowledge representation units as assemblies of segments becomes large. The number of segments retrieved also becomes large, and the number of retrieved segments becomes equal to or larger than a predetermined number. In such a manner, the control unit 16 functions as questioning sentence generating means for generating a questioning sentence to the user in the case where the number of retrieved segments is equal to or larger than a predetermined number.

Next, the control unit 21 of the inquiry answering server 20 receives an answering sentence to the questioning sentence to the user from the user, converts it to knowledge representation units, and transmits the knowledge representation units to the knowledge database server 15. The control unit 16 in the knowledge database server 15 selects the corresponding knowledge representation unit from the narrowed-down knowledge representation units on the basis of each segment in the knowledge representation units in the received answering sentence (step S21). Concretely, in the case where an answer "in shop A" to the questioning sentence "Where did you buy" to the user is received, the knowledge representation unit is selected on the basis of information of the segment of the locative case L in the answer.

The control unit 16 extracts, as an answering segment, a segment in the knowledge representation unit matching the type of the questioning segment in the original user questioning sentence from the selected knowledge representation unit, replaces it with an interrogative of the questioning segment in the questioning sentence from the user or replaces the questioning segment with the answering segment, thereby converting the questioning sentence from the user to an answering sentence. The control unit 16 transmits the answering sentence as the selection result to the inquiry answering server 20.

The control unit 16 refers to the document extracted as described above and retrieves a segment to extract, as an answering segment, a segment in the knowledge representation unit matching the type of the questioning segment in the original questioning sentence from the user in order to compensate a segment (50w) missing in the segments in the questioning sentence from the user in the knowledge representation unit 50 in leaf segments in the documents.

The control unit 21 transmits the selection result received from the inquiry answering server 20 as an answer to the terminal 2 of the user (step S22).

According to the embodiment as described above, the knowledge database server 15 stores the knowledge representation units 30 and 31 in sentence information on a sentence in collected documents into the knowledge database 17, the inquiry answering server 20 receives the information of a questioning sentence from the user from the terminal 2, decomposes the questioning sentence from the user into segments, and classifies each of the segments in the questioning sentence from the user into the question segment 50w related to questions and the non-questioning segment 50u which is not related to questions. The knowledge database server 15 retrieves the knowledge representation units 30 and 31 corresponding to the questioning sentence from the user from the knowledge database 17 on the basis of the information of the type of the question segment 50w and the information of the non-questioning segment 50u. The inquiring answering server 20 transmits the retrieval result to the terminal 2. In such a manner, the information retrieving system 1 performs a search based on the questioning sentence from the user and the structure of a sentence in documents collected, so that the search result can be accurately answered to the questioning part in the question from the user.

According to the embodiment, documents is collected, a sentence in the collected documents is decomposed to segments; a modification relation between segments in the sentence in the documents is parsed, the segments are classified to at least leaf segments 301 and 311 and root segments 30r and 30r, the arcs 30a or the like are given to the modification relations between the segments, the documents, the segments in the documents, and the segment kind are stored, information of a questioning sentence from the user to be input to the terminal 2 of the user is received from the terminal 2, the questioning sentence from the user is decomposed to segments, a modification relation between segments in the questioning sentence from the user is parsed, documents including a root segment corresponding to a root segment in the questioning sentence from the user is extracted by referring to the document structure storing means which classifies each of the segments to at least the leaf segment 50l and the root segment 50r, a segment which is missing in segments of the questioning sentence from the user, in leaf segments in the documents is retrieved by referring to the extracted documents, and the segment retrieved is transmitted to the terminal 2. Therefore, a search result can be sent as an answering sentence accurately to the question part of the question from the user.

According to the embodiment, the suitable database (knowledge database 17) which specifies a document structure on the basis of the morphological analysis and the dependency parsing and, after that, converts the document structure to a structure adapted to a search is prepared. Consequently, even in the case of a document whose subjective case is the root segment such as a document ended with a noun, a leaf segment connected to the subjective case is converted to the root segment for a search, and the resultant document is stored in the database. Thus, a search result can be replied more accurately to a question from the user.

Further, according to the embodiment, a search result can be replied accurately to a question from the user on the basis of the number of arcs in the question and the number of arcs of a target to be retrieved. Therefore, by eliminating noise from the search result, the search result can be replied more accurately to the question from the user.

The number of arcs in the root segment and the number of arcs in a leaf segment connected to the root segment via an arc are compared with each other. When the number of arcs in the root segment is smaller than that in the leaf segment, the leaf segment is converted to the root segment for a search, and the root segment is converted to a leaf segment for a search. The document structure storing means stores the segment and the are subjected to the conversion into the knowledge database 17. Consequently, the representation of a sentence is standardized and the difference in the surface representation of sentences are absorbed. Thus, the knowledge database 17 is formed compact, and increase in the speed of a search is realized.

A search is not performed by matching the entire information of a questioning sentence at once. Information of a part of a sentence such as the non-questioning segment 50$u$ is matched first. Candidates of answering sentences are accurately roughly narrowed down and, by information of the type such as the case and a part of speech of the questioning segment 50$w$, are further narrowed down. Thus, an answer can be efficiently, accurately given to the user almost without failing to answer the question. Although the example of performing the morphological analysis and the dependency parsing without changing collected documents has been described in the foregoing embodiment, in the case where one sentence is long, a database for a proper answer may not be generated. Consequently, as another embodiment, in the case where a document exceeding a predetermined number of characters or a predetermined number of words is received, it is preferable to divide the document to parts by a punctuation and a relative pronoun and analyzes both the entire document and the divided parts.

In the case where the information retrieving system 1 transmits an answering sentence based on sentence information retrieved to the terminal 2, the answer is given in a sentence to the user, so that a feeling of strangeness is little. Since storage and search is performed by the structure of a sentence in the knowledge representation unit, it is easy to generate a sentence of an answer to a question. A search result can be accurately sent as an answer sentence.

In the case where the information retrieving system 1 extracts a segment having a type matched with the type of the questioning segment 50$w$ from the retrieved sentence information, obtains an answering segment, and transmits information on the answering segment to the terminal 2, an answer of the core part of the question can be accurately provided to the user in a pinpoint manner. An answer to the question part in a question can be accurately given.

In the case where the information retrieving system 1 analyzes the modification relation between segments in the questioning sentence from the user and retrieves the knowledge representation units 30 and 31 from the knowledge database 17 on the basis of information of a segment on which other segments depend such as the root segment 50$r$ between the non-questioning segments 50$u$, since the relation between the segments is considered, an answer can be found from the knowledge database 17 more accurately. The root segment 50$r$ and a part of leaf segments (which is converted to the root segment by standardization) are segments on which other segments depend concentratedly, and information of the structure of the sentence is concentrated. Therefore, a search can be efficiently conducted on the basis of a depended segment.

In the case where the knowledge database 17 stores, as sentence information, sentence information based on the modification relation between segments in a sentence in documents and the information retrieving system 1 performs a search by collation between a depended segment in a questioning sentence from the user and a depended segment in the sentence information, for example, when a search is performed first by collation between the root segment 50$r$ and the root segments 30$r$ and 31$r$, first candidates of knowledge representation units corresponding to an answer can be easily accurately collected from the knowledge representation units in the knowledge database 17. Since the unit is handled as the knowledge representation unit structured like the modification relation between the segments, by including the knowledge of the structure in the manner of a search, the search is conducted more easily.

In the case where the information retrieving system 1 performs a search on the basis of the number of segments (the number of arcs) depending on the depended segment such as the root segment 50$r$ in the questioning sentence from the user, candidates are narrowed down by the non-questioning segment 50$u$ and, after that, further narrowed down by the number of arcs. Thus, an answering sentence can be retrieved more accurately.

In the case where the information retrieving system 1 as document extracting means extracts each of documents including a root segment corresponding to the root segment in a questioning sentence from the user and of a root segment having the number of arcs exceeding the number of arcs of the root segment in the questioning sentence from the user with reference to the document structure storing means, the candidates are narrowed down by the number of arcs more accurately. Thus, an answering document can be retrieved more accurately.

In the case of generating a questioning sentence to the user to the user on the basis of the retrieved sentence information (retrieved segment) and transmitting it to the terminal 2, when the number of knowledge representation units 30 and 31 as candidates exceeds the predetermined number, by generating a questioning sentence to the user for narrowing down candidates of answering sentences and sending it to the user, a dialogue with the user is held, and an answer is obtained from the user. Thus, the candidates of the answering sentence can be narrowed down more reliably.

Also in the case of transmitting the questioning sentence to the user to the terminal 2 in place of the retrieved segment, a dialog with the user is held, and an answer is obtained from the user. Thus, candidates of the answering sentence can be narrowed down more accurately.

By generating a questioning sentence to the user in the case where the number of segments retrieved is equal to or larger than a predetermined number, either the questioning sentence to the user or the retrieved segment can be selectively transmitted to the terminal 2, and a clear criterion of generating the questioning sentence to the user can be determined.

In the case where the questioning sentence from the user does not include a verb such as a questioning sentence from the user "Where does he?", the root segment 50$r$ becomes a null segment, and the steps S12 to S14 are skipped. By the non-questioning segment 50$u$ in the leaf segment 50$l$ in step S15 and the questioning segment 50$w$ in step S16, the candidates of the answering sentences are narrowed down. Since the amount of information to be narrowed is small, there is often a case that the number of candidates of the answering sentence is large. In such a case, by transmitting a questioning sentence to the user and interactively obtaining an answer from the user, candidates of the answering sentence can be narrowed down reliably.

A database generating apparatus constructed by the knowledge input management server 10, the knowledge database server 15, and the like decomposes a sentence in documents via the network 3 or the like or documents collected from the text data database 6 to segments, analyzes the modification relation between segments in the sentence in the documents, structurizes the sentence in the documents on the basis of the modification relation, and stores the structurized sentence of the documents to the knowledge database 17. In such a manner, the knowledge representation units 30 and 31 are independent of each other, and management of data is facilitated by the knowledge representation units 30 and 31. For example, as shown in FIG. 4, the knowledge database 17 is easily managed as follows. On the basis of information of the generation time field 40*f* and the access field 40*g* in the knowledge representation unit 40 in the table form, the knowledge database server 15 deletes the knowledge representation unit which is not often used or adds a new knowledge representation unit. Since the sentence in the documents is structurized, the knowledge database server 15 easily conducts a search according to the questioning sentence from the user.

The knowledge database server 15 reverses the direction of the modification relation (the direction of the arc) in the structurized sentence in the documents and operates the type of the segment having the modification relation reversed, thereby enabling difference in the surface representation of the knowledge representation unit to be absorbed and the knowledge representation unit to be standardized. For example, as shown in FIG. 9, by converting the leaf segment 321 having many arcs so that the directions of the arcs are aligned and by operating the type of the segment, the knowledge representation unit 34 equivalent to the knowledge representation unit 30 can be obtained and the knowledge representation units can be standardized. By the standardization, the number of data pieces can be reduced, and the performance of the retrieval can be improved.

It is not always necessary to request the user to enter a questioning sentence from the user in the form of a sentence. For example, as shown in FIG. 13A, a question entry form 25 may be used. The question entry form 25 has input boxes 25*a* for types of segments. The inquiry answering server 20 transmits the question entry form 25 to the terminal 2 of the user and the user enters phrases in the question entry form 25 as shown in FIG. 13B. The terminal 2 receiving an entry from the user connects the phrases and the types of the segments and transmits the resultant to the inquiry answering server 20. Based on the information, the inquiry answering server 20 converts the entry to the knowledge representation unit 50 or the like.

The knowledge database server 15 functioning as a search engine may perform a search on the basis of user history. For example, to finally narrow down the candidates of the answering sentences after the step S16 or to narrow down the candidates of the answering sentences after roughly narrowing the answering sentence candidates in step S13, the knowledge database server 15 uses the user history. By further narrowing down the candidates of the answering sentence on the basis of the user history such as the profile of the user, purchase history and information of accesses to the knowledge representation units, the answering sentence can be provided accurately to the user.

In step S13, the candidates of the answering sentence may be narrowed down not by the root segment 50*r* as a depended segment but by another leaf segment. Dependencies are often concentrated on a part of leaf segments and information on data structure is concentrated, so that candidates of the answering sentence are easily narrowed down primarily.

The program of the segment classifying means, the document segment decomposing means, and the document dependency parsing means in the knowledge database server 15 and the program of the segment classifying means, the document decomposing means, and the dependency parsing means of the inquiry answering server 20 may be a common program. The processes may be performed by a common server.

Further, the present invention is not limited to the foregoing embodiments. The embodiments are illustrative, and anything having substantially the same configuration as the technical ideas described in the scope of claims of the present invention and producing similar effects is included in the technical scope of the present invention.

DESCRIPTION OF REFERENCE NUMERALS

1: information retrieving system
2: terminal
10: knowledge input management server
11: control unit
15: knowledge database server
16: control unit
17: knowledge database (database)
20: inquiry answering server
21: control unit
30, 31: knowledge representation unit (sentence information, sentence of structured document)
30*r*, 31*r*: root segment (depended segment)
30*l*: leaf segment
50, 60: knowledge representation unit in questioning sentence
50*w*, 60*w*: questioning segment
50*u*: non-questioning segment
50*r*: root segment (depended segment)
50*l*: leaf segment
60*e*: field of the number of arcs (the number of segments, the number of arcs)

What is claimed is:

1. An information retrieving apparatus comprising:
a processor coupled to a memory including:
a document collecting unit that collects documents;
a first document segment decomposing unit that decomposes a sentence in the collected documents into segments;
a first document dependency parsing unit that parses a modification relation between segments in the sentence in the documents, and classifying each of the segments to kinds of the segments of at least a leaf segment and a root segment;
a document structure storing unit that stores the documents, the sentences in the documents, the segments in the sentences, and the kinds of the segments;
a receiving unit that receives, from a user terminal, information of a questioning sentence from the user to be input to the user terminal;
a second document segment decomposing unit that decomposes the questioning sentence from the user into segments;
a second document dependency parsing unit that parses a modification relation between segments in the questioning sentence from the user and classifying each of the segments to kinds of the segments of at least a leaf segment and a root segment;
a sentence extracting unit that extracts each of sentences including a root segment corresponding to a root segment in the questioning sentence from the user by referring to the document structure storing unit;
a retrieving unit that retrieves a leaf segment which is missing in leaf segments of the questioning sentence from the user, in leaf segments in each of sentences with reference to the extracted sentences; and
a transmitting unit that transmits the segment retrieved by the retrieving unit to the terminal,
wherein the first document dependency parsing unit gives an arc to a modification relation between segments in the sentence in the collected documents,
the first document dependency parting unit compares the number of arcs in a root segment with the number of arcs of a leaf segment connected to the root segment via an arc, in the case where the number of arcs of the root segment is smaller than that of the leaf segment, converts the kinds of the segments from the leaf segment to a root segment for a search, and converts the kinds of the segments from the root segment to a leaf segment, for a search, and the document structure storing unit stores the segment, the kinds of segments and the arc subjected to the conversion.

2. The information retrieving apparatus according to claim 1, wherein the sentence extracting unit extracts each of sentences including a root segment corresponding to a root segment in the questioning sentence from the user, and the root segment having the number of arcs exceeding the number of arcs of the root segment in the questioning sentence from the user, with reference to the document structure storing unit.

3. The information retrieving apparatus according to claims 1, further comprising a questioning sentence generating unit for generating a questioning sentence to the user on the basis of the retrieved segment, wherein the transmitting unit transmits the questioning sentence to the user to the user terminal.

4. The information retrieving apparatus according to claim 3, wherein the questioning sentence generating unit generates a questioning sentence to the user when the number of retrieved segments is equal to or larger than predetermined number.

5. The information retrieving apparatus according to claims 1, further comprising a questioning sentence generating unit for generating a questioning sentence to the user on the basis of the retrieved segment, wherein the transmitting unit transmits the questioning sentence to the user to the user terminal in place of the retrieved segment.

6. The information retrieving apparatus according to claim 5, wherein the questioning sentence generating unit generates a questioning sentence to the user when the number of retrieved segments is equal to or larger than predetermined number.

7. An information retrieving method comprising:
a document collecting step of collecting documents;
a first document segment decomposing step of decomposing a sentence in the collected documents into segments;
a first document dependency parsing step of parsing a modification relation between segments in the sentence in the documents and classifying the segments to kinds of the segments of at least a leaf segment and a root segment;
a storing step of storing the documents, the sentences in the documents, the segments in the sentences, and the kinds of the segments into a document structure storing unit;
a receiving step of storing information of a questioning sentence from the user to be input to the user terminal from the terminal;
a second document segment decomposing step of decomposing the questioning sentence from the user into segments;
a second document dependency parsing step of parsing a modification relation between segments in the questioning sentence from the user and classifying the segments to kinds of the segments of at least a leaf segment and a root segment;
a sentence extracting step of extracting each of sentences including a root segment corresponding to a root segment in the questioning sentence from the user by referring to the document structure storing unit;
a retrieving step of retrieving a leaf segment which is missing in leaf segments of the questioning sentence from the user, in leaf segments in each of sentences with reference to the extracted sentences; and a transmitting step of transmitting the segment retrieved in the retrieving step to the terminal, wherein the first document segment decomposing step gives an arc to a modification relation between segments in the sentence in the collected documents, the first document segment decomposing step compares the number of arcs in a root segment with the number of arcs of a leaf segment connected to the root segment via an arc, in the case where the number of arcs of the root segment is smaller than that of the leaf segment, converts the kinds of the segments from the leaf segment to a root segment for a search, and converts the kinds of the segments from the root segment to a leaf segment for a search, and the storing step stores the segment and the arc subjected to the conversion.

8. A non-transitory computer-readable recording medium which records a program for making a computer function as:
a document collecting unit that collects documents;
a first document segment decomposing unit that decomposes a sentence in the collected documents into segments;
a first document dependency parsing unit that parses a modification relation between segments in the sentence in the documents, and classifying each of the segments to kinds of the segments of at least a leaf segment and a root segment;
a document structure storing unit that stores the documents, the sentences in the documents, the segments in the sentences, and the kinds of the segments;
a receiving unit that receives, from a user terminal, information of a questioning sentence from the user to be input to the user terminal;
a second document segment decomposing unit that decomposes the questioning sentence from the user into segments;
a second document dependency parsing unit that parses a modification relation between segments in the questioning sentence from the user and classifying each of the segments to kinds of the segments of at least a leaf segment and a root segment;
a sentence extracting unit that extracts each of sentences including a root segment corresponding to a root segment in the questioning sentence from the user by referring to the document structure storing unit;
a retrieving unit that retrieves a leaf segment which is missing in leaf segments of the questioning sentence from the user, in leaf segments in each of sentences with reference to the extracted sentences; and
a transmitting unit that transmits the segment retrieved by the retrieving unit to the terminal, wherein the first document dependency parsing unit gives an arc to a modification relation between segments in the sentence in the collected documents, the first document dependency parting unit compares the number of arcs in a root segment with the number of arcs of a leaf segment connected to the root segment via an arc, in the case where the number of arcs of the root segment is smaller than that of the leaf segment, converts the kinds of the segments from the leaf segment to a root segment for a search, and converts the kinds of the segments from the root segment to a leaf segment for a search, and the document structure storing unit stores the segment and the arc subjected to the conversion.

* * * * *